(12) United States Patent
Styles et al.

(10) Patent No.: US 8,433,759 B2
(45) Date of Patent: Apr. 30, 2013

(54) DIRECTION-CONSCIOUS INFORMATION SHARING

(75) Inventors: Andrew G. Styles, Foster City, CA (US); Christian G. Phillips, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 189 days.

(21) Appl. No.: 12/786,338

(22) Filed: May 24, 2010

(65) Prior Publication Data

US 2011/0289147 A1   Nov. 24, 2011

(51) Int. Cl.
*G06F 15/16* (2006.01)

(52) U.S. Cl.
USPC ....................... 709/205; 455/456.3

(58) Field of Classification Search ............... 455/456.3, 455/466, 411, 414.1; 715/772, 863; 382/313; 342/359; 709/205
See application file for complete search history.

(56) References Cited

U.S. PATENT DOCUMENTS

| | | |
|---|---|---|
| 4,367,458 A | 1/1983 | Hackett |
| 4,422,093 A | 12/1983 | Pargee, Jr. |
| 4,499,568 A | 2/1985 | Gremillet |
| 4,506,387 A | 3/1985 | Walter |
| 4,569,015 A | 2/1986 | Dolev et al. |
| 4,849,811 A | 7/1989 | Kleinerman |
| 4,897,717 A | 1/1990 | Hamilton et al. |
| 4,918,523 A | 4/1990 | Simon et al. |
| 4,949,187 A | 8/1990 | Cohen |
| 4,963,995 A | 10/1990 | Lang |
| 4,974,178 A | 11/1990 | Izeki et al. |
| 5,010,399 A | 4/1991 | Goodman et al. |
| 5,018,021 A | 5/1991 | Slater |
| 5,034,807 A | 7/1991 | Von Kohorn |
| 5,057,932 A | 10/1991 | Lang |
| 5,107,489 A | 4/1992 | Brown et al. |
| 5,132,992 A | 7/1992 | Yurt et al. |
| 5,164,839 A | 11/1992 | Lang |
| 5,187,787 A | 2/1993 | Skeen et al. |
| 5,222,134 A | 6/1993 | Waite et al. |
| 5,233,423 A | 8/1993 | Jernigan et al. |
| 5,241,682 A | 8/1993 | Bryant et al. |

(Continued)

FOREIGN PATENT DOCUMENTS

| | | |
|---|---|---|
| EP | 773490 | 5/1997 |
| EP | 795809 | 9/1997 |

(Continued)

OTHER PUBLICATIONS

"Brief for Appellants", In re Masayuki Chatani et al., U.S. Court of Appeals for the Federal Circuit (2007-1150) (Mar. 23, 2007).

(Continued)

*Primary Examiner* — Jungwon Chang
(74) *Attorney, Agent, or Firm* — Carr & Ferrell LLP

(57) ABSTRACT

Direction-conscious information sharing is disclosed. User input specifying information to be shared and a direction relative to the sender device is received. A recipient device is identified as being located in a target area in the specified direction relative to the sender device. The specified information is sent to the identified recipient device, including data to allow the receiving device to generate a notification indicating a direction of the sender device relative to the recipient device.

38 Claims, 5 Drawing Sheets

U.S. PATENT DOCUMENTS

| | | |
|---|---|---|
| 5,253,275 A | 10/1993 | Yurt et al. |
| 5,276,866 A | 1/1994 | Paolini |
| 5,313,467 A | 5/1994 | Varghese et al. |
| 5,339,392 A | 8/1994 | Risberg et al. |
| 5,341,477 A | 8/1994 | Pitkin et al. |
| 5,392,278 A | 2/1995 | Teel et al. |
| 5,416,779 A | 5/1995 | Barnes et al. |
| 5,436,653 A | 7/1995 | Ellis et al. |
| 5,481,178 A | 1/1996 | Wilcox et al. |
| 5,490,216 A | 2/1996 | Richardson, III |
| 5,504,894 A | 4/1996 | Ferguson et al. |
| 5,508,731 A | 4/1996 | Kohorn |
| 5,508,733 A | 4/1996 | Kassatly |
| 5,511,186 A | 4/1996 | Carhart et al. |
| 5,522,087 A | 5/1996 | Hsiang |
| 5,523,551 A | 6/1996 | Scott |
| 5,524,051 A | 6/1996 | Ryan |
| 5,532,735 A | 7/1996 | Blahut et al. |
| 5,539,448 A | 7/1996 | Verhille et al. |
| 5,541,638 A | 7/1996 | Story |
| 5,543,591 A | 8/1996 | Gillespie et al. |
| 5,548,784 A | 8/1996 | Easley, Jr. et al. |
| 5,550,863 A | 8/1996 | Yurt et al. |
| 5,572,442 A | 11/1996 | Schulhof et al. |
| 5,586,261 A | 12/1996 | Brooks et al. |
| 5,590,195 A | 12/1996 | Ryan |
| 5,630,757 A | 5/1997 | Gagin et al. |
| 5,636,277 A | 6/1997 | Nagahama |
| 5,675,571 A | 10/1997 | Wilson |
| 5,680,619 A | 10/1997 | Gudmundson et al. |
| 5,682,139 A | 10/1997 | Pradeep et al. |
| 5,701,582 A | 12/1997 | DeBey |
| 5,704,032 A | 12/1997 | Badovinatz et al. |
| 5,721,827 A | 2/1998 | Logan et al. |
| 5,737,311 A | 4/1998 | Wyld |
| 5,751,336 A | 5/1998 | Aggarwal et al. |
| 5,751,806 A | 5/1998 | Ryan |
| 5,764,158 A | 6/1998 | Franklin et al. |
| 5,767,913 A | 6/1998 | Kassatly |
| 5,778,187 A | 7/1998 | Monteiro et al. |
| 5,790,177 A | 8/1998 | Kassatly |
| 5,794,217 A | 8/1998 | Allen |
| 5,809,145 A | 9/1998 | Slik et al. |
| 5,809,450 A | 9/1998 | Chrysos et al. |
| 5,809,472 A | 9/1998 | Morrison |
| 5,815,671 A | 9/1998 | Morrison |
| 5,823,879 A | 10/1998 | Goldberg et al. |
| 5,826,085 A | 10/1998 | Bennett et al. |
| 5,831,662 A | 11/1998 | Payton |
| 5,838,314 A | 11/1998 | Neel et al. |
| 5,838,909 A | 11/1998 | Roy et al. |
| 5,841,980 A | 11/1998 | Waters et al. |
| 5,845,265 A | 12/1998 | Woolston |
| 5,864,316 A * | 1/1999 | Bradley et al. ................. 342/359 |
| 5,864,854 A | 1/1999 | Boyle |
| 5,867,494 A | 2/1999 | Krishnaswamy et al. |
| 5,879,236 A | 3/1999 | Lambright |
| 5,880,411 A | 3/1999 | Gillespie et al. |
| 5,892,536 A | 4/1999 | Logan et al. |
| 5,892,900 A | 4/1999 | Ginter et al. |
| 5,893,106 A | 4/1999 | Brobst et al. |
| 5,903,892 A | 5/1999 | Hoffert et al. |
| 5,913,040 A | 6/1999 | Rakavy et al. |
| 5,914,941 A | 6/1999 | Janky |
| 5,923,872 A | 7/1999 | Chrysos et al. |
| 5,924,068 A | 7/1999 | Richard et al. |
| 5,933,063 A | 8/1999 | Keung et al. |
| 5,933,603 A | 8/1999 | Vahalia et al. |
| 5,940,738 A | 8/1999 | Rao |
| 5,941,947 A | 8/1999 | Brown et al. |
| 5,956,485 A | 9/1999 | Perlman |
| 5,956,629 A | 9/1999 | Morrison |
| 5,960,196 A | 9/1999 | Carrier, III et al. |
| 5,963,202 A | 10/1999 | Polish |
| 5,964,867 A | 10/1999 | Anderson et al. |
| 5,983,176 A | 11/1999 | Hoffert et al. |
| 5,984,787 A | 11/1999 | Redpath |
| 5,986,692 A | 11/1999 | Logan et al. |
| 5,987,376 A | 11/1999 | Olson et al. |
| 5,987,525 A | 11/1999 | Roberts et al. |
| 5,995,705 A | 11/1999 | Lang |
| 6,000,044 A | 12/1999 | Chrysos et al. |
| 6,002,720 A | 12/1999 | Yurt et al. |
| 6,003,030 A | 12/1999 | Kenner et al. |
| 6,041,312 A | 3/2000 | Bickerton et al. |
| 6,041,329 A | 3/2000 | Kishi |
| 6,044,335 A | 3/2000 | Ksendzov |
| 6,049,539 A | 4/2000 | Lee et al. |
| 6,050,898 A | 4/2000 | Vange et al. |
| 6,057,845 A | 5/2000 | Dupouy |
| 6,061,504 A | 5/2000 | Tzelnic et al. |
| 6,066,182 A | 5/2000 | Wilde et al. |
| 6,067,278 A | 5/2000 | Owens et al. |
| 6,070,009 A | 5/2000 | Dean et al. |
| 6,070,141 A | 5/2000 | Houvener et al. |
| 6,073,123 A | 6/2000 | Staley |
| 6,081,785 A | 6/2000 | Oshima et al. |
| 6,085,176 A | 7/2000 | Woolston |
| 6,085,262 A | 7/2000 | Sawada |
| 6,088,455 A | 7/2000 | Logan et al. |
| 6,088,721 A | 7/2000 | Lin et al. |
| 6,092,180 A | 7/2000 | Anderson et al. |
| 6,105,098 A | 8/2000 | Ninose et al. |
| 6,105,099 A | 8/2000 | Freitas et al. |
| 6,106,569 A | 8/2000 | Bohrer et al. |
| 6,108,569 A | 8/2000 | Shen |
| 6,108,703 A | 8/2000 | Leighton et al. |
| 6,117,011 A | 9/2000 | Lvov |
| 6,119,075 A | 9/2000 | Dean et al. |
| 6,119,108 A | 9/2000 | Holmes et al. |
| 6,135,646 A | 10/2000 | Kahn et al. |
| 6,137,480 A | 10/2000 | Shintani |
| 6,142,472 A | 11/2000 | Kliebisch |
| 6,144,702 A | 11/2000 | Yurt et al. |
| 6,148,335 A | 11/2000 | Haggard et al. |
| 6,148,396 A | 11/2000 | Chrysos et al. |
| 6,152,824 A | 11/2000 | Rothschild et al. |
| 6,154,773 A | 11/2000 | Roberts et al. |
| 6,154,782 A | 11/2000 | Kawaguchi et al. |
| 6,157,955 A | 12/2000 | Narad et al. |
| 6,161,132 A | 12/2000 | Roberts et al. |
| 6,163,692 A | 12/2000 | Chakrabarti et al. |
| 6,163,840 A | 12/2000 | Chrysos et al. |
| 6,173,322 B1 | 1/2001 | Hu |
| 6,175,814 B1 | 1/2001 | Chrysos et al. |
| 6,178,160 B1 | 1/2001 | Bolton et al. |
| 6,185,532 B1 | 2/2001 | Lemaire et al. |
| 6,189,146 B1 | 2/2001 | Misra et al. |
| 6,192,340 B1 | 2/2001 | Abecassis |
| 6,195,432 B1 | 2/2001 | Takahashi et al. |
| 6,195,748 B1 | 2/2001 | Chrysos et al. |
| 6,199,076 B1 | 3/2001 | Logan et al. |
| 6,199,110 B1 | 3/2001 | Rizvi et al. |
| 6,201,771 B1 | 3/2001 | Otsuka et al. |
| 6,202,051 B1 | 3/2001 | Woolston |
| 6,203,433 B1 | 3/2001 | Kume |
| 6,212,521 B1 | 4/2001 | Minami et al. |
| 6,219,045 B1 | 4/2001 | Leahy et al. |
| 6,230,192 B1 | 5/2001 | Roberts et al. |
| 6,230,207 B1 | 5/2001 | Roberts et al. |
| 6,233,633 B1 | 5/2001 | Douma |
| 6,237,073 B1 | 5/2001 | Dean et al. |
| 6,240,459 B1 | 5/2001 | Roberts et al. |
| 6,246,672 B1 | 6/2001 | Lumelsky |
| 6,247,017 B1 | 6/2001 | Martin |
| 6,247,131 B1 | 6/2001 | Kotani et al. |
| 6,253,237 B1 | 6/2001 | Story et al. |
| 6,260,141 B1 | 7/2001 | Park |
| 6,262,777 B1 | 7/2001 | Brewer et al. |
| 6,263,433 B1 | 7/2001 | Robinson et al. |
| 6,266,651 B1 | 7/2001 | Woolston |
| 6,282,549 B1 | 8/2001 | Hoffert et al. |
| 6,300,880 B1 | 10/2001 | Sitnik |
| 6,311,209 B1 | 10/2001 | Olson et al. |
| 6,314,451 B1 | 11/2001 | Landsman et al. |
| 6,327,624 B1 | 12/2001 | Mathewson, II et al. |
| 6,330,593 B1 | 12/2001 | Roberts et al. |

| | | |
|---|---|---|
| 6,345,297 B1 | 2/2002 | Grimm et al. |
| 6,352,479 B1 | 3/2002 | Sparks, II |
| 6,360,266 B1 | 3/2002 | Pettus |
| 6,360,275 B1 | 3/2002 | Chu et al. |
| 6,363,416 B1 | 3/2002 | Naeimi et al. |
| 6,370,543 B2 | 4/2002 | Hoffert et al. |
| 6,393,430 B1 | 5/2002 | Van Ryzin |
| 6,400,996 B1 | 6/2002 | Hoffberg et al. |
| 6,405,203 B1 | 6/2002 | Collart |
| 6,407,750 B1 | 6/2002 | Gioscia et al. |
| 6,421,717 B1 | 7/2002 | Kloba et al. |
| 6,421,726 B1 | 7/2002 | Kenner et al. |
| 6,421,728 B1 | 7/2002 | Mohammed et al. |
| 6,434,535 B1 | 8/2002 | Kupka et al. |
| 6,446,080 B1 | 9/2002 | Van Ryzin et al. |
| 6,446,260 B1 | 9/2002 | Wilde et al. |
| 6,449,226 B1 | 9/2002 | Kumagai |
| 6,453,252 B1 | 9/2002 | Laroche |
| 6,460,076 B1 | 10/2002 | Srinivasan |
| 6,463,078 B1 | 10/2002 | Engstrom et al. |
| 6,470,085 B1 | 10/2002 | Uranaka et al. |
| 6,484,221 B1 | 11/2002 | Lorinser et al. |
| 6,487,583 B1 | 11/2002 | Harvey et al. |
| 6,487,678 B1 | 11/2002 | Briskey et al. |
| 6,496,826 B1 | 12/2002 | Chowdhury et al. |
| 6,502,125 B1 | 12/2002 | Kenner et al. |
| 6,505,342 B1 | 1/2003 | Hartmann et al. |
| 6,519,629 B2 | 2/2003 | Harvey et al. |
| 6,529,453 B1 | 3/2003 | Otsuka et al. |
| 6,530,840 B1 | 3/2003 | Cuomo et al. |
| 6,539,424 B1 | 3/2003 | Dutta |
| 6,546,448 B1 | 4/2003 | Lai et al. |
| 6,549,930 B1 | 4/2003 | Chrysos et al. |
| 6,549,946 B1 | 4/2003 | Fisher et al. |
| 6,553,003 B1 | 4/2003 | Chang |
| 6,553,030 B2 | 4/2003 | Ku et al. |
| 6,553,413 B1 | 4/2003 | Leighton et al. |
| 6,560,636 B2 | 5/2003 | Cohen et al. |
| 6,560,640 B2 | 5/2003 | Smethers |
| 6,561,811 B2 | 5/2003 | Rapoza et al. |
| 6,564,336 B1 | 5/2003 | Majkowski |
| 6,574,234 B1 | 6/2003 | Myer et al. |
| 6,587,874 B1 | 7/2003 | Golla et al. |
| 6,594,740 B1 | 7/2003 | Fukuda |
| 6,605,342 B1 | 8/2003 | Burghaus et al. |
| 6,607,444 B2 | 8/2003 | Takahashi et al. |
| 6,610,936 B2 | 8/2003 | Gillespie et al. |
| 6,611,607 B1 | 8/2003 | Davis et al. |
| 6,625,152 B1 | 9/2003 | Monsen et al. |
| 6,625,722 B1 | 9/2003 | Lancaster |
| 6,631,412 B1 | 10/2003 | Glasser et al. |
| 6,637,031 B1 | 10/2003 | Chou |
| 6,640,306 B1 | 10/2003 | Tone et al. |
| 6,661,430 B1 | 12/2003 | Brewer et al. |
| 6,665,706 B2 | 12/2003 | Kenner et al. |
| 6,676,521 B1 | 1/2004 | La Mura et al. |
| 6,687,817 B1 | 2/2004 | Paul |
| 6,694,025 B1 | 2/2004 | Epstein et al. |
| 6,701,344 B1 | 3/2004 | Holt et al. |
| 6,714,966 B1 | 3/2004 | Holt et al. |
| 6,718,264 B2 | 4/2004 | Takahashi |
| 6,732,147 B1 | 5/2004 | Holt et al. |
| 6,738,983 B1 | 5/2004 | Rao et al. |
| 6,748,420 B1 | 6/2004 | Quatrano et al. |
| 6,750,852 B2 | 6/2004 | Gillespie et al. |
| 6,754,233 B1 | 6/2004 | Henderson et al. |
| 6,754,845 B2 | 6/2004 | Kursawe et al. |
| 6,756,783 B2 | 6/2004 | Brune et al. |
| 6,757,543 B2 | 6/2004 | Moran et al. |
| 6,761,636 B2 | 7/2004 | Chung et al. |
| 6,763,371 B1 | 7/2004 | Jandel |
| 6,763,392 B1 | 7/2004 | del Val et al. |
| 6,782,421 B1 | 8/2004 | Soles et al. |
| 6,799,255 B1 | 9/2004 | Blumenau et al. |
| 6,801,930 B1 | 10/2004 | Dionne et al. |
| 6,804,825 B1 | 10/2004 | White et al. |
| 6,829,634 B1 | 12/2004 | Holt et al. |
| 6,832,318 B1 | 12/2004 | Yaegashi et al. |
| 6,850,252 B1 | 2/2005 | Hoffberg |
| 6,910,069 B1 | 6/2005 | Holt et al. |
| 6,920,497 B1 | 7/2005 | Bourassa et al. |
| 6,920,565 B2 | 7/2005 | Isaacson et al. |
| 6,931,446 B1 | 8/2005 | Cox et al. |
| 6,963,964 B2 | 11/2005 | Luick |
| 6,987,221 B2 | 1/2006 | Platt |
| 6,987,813 B1 | 1/2006 | Demetrescu et al. |
| 6,990,338 B2 | 1/2006 | Miller et al. |
| 7,003,550 B1 | 2/2006 | Cleasby et al. |
| 7,006,881 B1 | 2/2006 | Hoffberg et al. |
| 7,016,942 B1 | 3/2006 | Odom |
| 7,018,295 B2 | 3/2006 | Sakaguchi et al. |
| 7,025,675 B2 | 4/2006 | Fogel et al. |
| 7,027,773 B1 | 4/2006 | McMillin |
| 7,055,067 B2 | 5/2006 | DiJoseph |
| 7,056,217 B1 | 6/2006 | Pelkey et al. |
| 7,058,376 B2 | 6/2006 | Logan et al. |
| 7,076,475 B2 | 7/2006 | Honarvar |
| 7,093,007 B2 | 8/2006 | Patton |
| 7,100,047 B2 | 8/2006 | Stamos et al. |
| 7,107,312 B2 | 9/2006 | Hackbarth et al. |
| 7,177,950 B2 | 2/2007 | Narayan et al. |
| 7,181,494 B2 | 2/2007 | Lavoie et al. |
| 7,188,331 B2 | 3/2007 | Culter |
| 7,233,948 B1 | 6/2007 | Shamoon et al. |
| 7,257,623 B2 | 8/2007 | Viavant et al. |
| 7,266,771 B1 | 9/2007 | Tow et al. |
| 7,280,519 B1 | 10/2007 | Shane |
| 7,290,264 B1 | 10/2007 | Powers et al. |
| 7,305,170 B2 | 12/2007 | Okada et al. |
| 7,305,431 B2 | 12/2007 | Karnik et al. |
| 7,313,810 B1 | 12/2007 | Bell et al. |
| 7,320,131 B1 | 1/2008 | O'Toole, Jr. |
| 7,333,864 B1 | 2/2008 | Herley |
| 7,343,141 B2 | 3/2008 | Ellis et al. |
| 7,359,979 B2 | 4/2008 | Gentle et al. |
| 7,466,823 B2 | 12/2008 | Vestergaard et al. |
| 7,475,219 B2 | 1/2009 | O'Connor et al. |
| 7,574,488 B2 | 8/2009 | Matsubara |
| 7,587,465 B1 | 9/2009 | Muchow |
| 7,613,633 B1 | 11/2009 | Woolston |
| 7,711,847 B2 | 5/2010 | Dhupelia et al. |
| 7,716,238 B2 | 5/2010 | Harris |
| 7,720,908 B1 | 5/2010 | Newson et al. |
| 7,730,206 B2 | 6/2010 | Newson et al. |
| 7,792,902 B2 | 9/2010 | Chatani et al. |
| 7,822,809 B2 | 10/2010 | Dhupelia et al. |
| 7,831,666 B2 | 11/2010 | Chatani et al. |
| 7,908,362 B2 | 3/2011 | Ferguson et al. |
| 2001/0007981 A1 | 7/2001 | Woolston |
| 2001/0009868 A1 | 7/2001 | Sakaguchi et al. |
| 2001/0014891 A1 | 8/2001 | Hoffert et al. |
| 2001/0020295 A1 | 9/2001 | Satoh |
| 2001/0025256 A1 | 9/2001 | Oliphant et al. |
| 2001/0027561 A1 | 10/2001 | White et al. |
| 2001/0027563 A1 | 10/2001 | White et al. |
| 2001/0034721 A1 | 10/2001 | Boudreau et al. |
| 2001/0037466 A1 | 11/2001 | Fukutake et al. |
| 2001/0042021 A1 | 11/2001 | Matsuo et al. |
| 2001/0044339 A1 | 11/2001 | Cordero et al. |
| 2001/0051996 A1 | 12/2001 | Cooper et al. |
| 2002/0016922 A1 | 2/2002 | Richards et al. |
| 2002/0035604 A1 | 3/2002 | Cohen et al. |
| 2002/0037699 A1 | 3/2002 | Kobayashi et al. |
| 2002/0041584 A1 | 4/2002 | Sashihara |
| 2002/0042830 A1 | 4/2002 | Bose et al. |
| 2002/0046232 A1 | 4/2002 | Adams et al. |
| 2002/0049086 A1 | 4/2002 | Otsu |
| 2002/0052816 A1 | 5/2002 | Clenaghan et al. |
| 2002/0060994 A1 | 5/2002 | Kovacs et al. |
| 2002/0062348 A1 | 5/2002 | Maehiro |
| 2002/0075844 A1 | 6/2002 | Hagen |
| 2002/0077988 A1 | 6/2002 | Sasaki et al. |
| 2002/0082077 A1 | 6/2002 | Johnson et al. |
| 2002/0082997 A1 | 6/2002 | Kobata et al. |
| 2002/0103855 A1 | 8/2002 | Chatani |
| 2002/0104019 A1 | 8/2002 | Chatani et al. |
| 2002/0114455 A1 | 8/2002 | Asahi et al. |
| 2002/0115488 A1 | 8/2002 | Berry et al. |

| | | | | | | |
|---|---|---|---|---|---|---|
| 2002/0116206 A1 | 8/2002 | Chatani | | 2005/0105526 A1 | 5/2005 | Stiemerling et al. |
| 2002/0116275 A1 | 8/2002 | Woolston | | 2005/0157749 A1 | 7/2005 | Lee et al. |
| 2002/0116283 A1 | 8/2002 | Chatani | | 2005/0182937 A1 | 8/2005 | Bedi |
| 2002/0116471 A1 | 8/2002 | Shteyn | | 2005/0188373 A1 | 8/2005 | Inoue et al. |
| 2002/0116479 A1 | 8/2002 | Ishida et al. | | 2005/0198296 A1 | 9/2005 | Teodosiu et al. |
| 2002/0120925 A1 | 8/2002 | Logan | | 2005/0198388 A1 | 9/2005 | Teodosiu et al. |
| 2002/0122052 A1 | 9/2002 | Reich et al. | | 2005/0251577 A1 | 11/2005 | Guo et al. |
| 2002/0129094 A1 | 9/2002 | Reisman | | 2005/0254366 A1 | 11/2005 | Amar |
| 2002/0133707 A1 | 9/2002 | Newcombe | | 2005/0259637 A1 | 11/2005 | Chu et al. |
| 2002/0143781 A1 | 10/2002 | Lavoie et al. | | 2005/0262411 A1 | 11/2005 | Vertes et al. |
| 2002/0161709 A1 | 10/2002 | Floyd et al. | | 2005/0286426 A1 | 12/2005 | Padhye et al. |
| 2002/0188360 A1 | 12/2002 | Muramori et al. | | 2006/0075127 A1 | 4/2006 | Juncker et al. |
| 2002/0196940 A1 | 12/2002 | Isaacson et al. | | 2006/0089163 A1* | 4/2006 | Khawand et al. ............ 455/466 |
| 2002/0198929 A1 | 12/2002 | Jones et al. | | 2006/0100020 A1 | 5/2006 | Kasai |
| 2002/0198930 A1 | 12/2002 | Jones et al. | | 2006/0123053 A1 | 6/2006 | Scannell, Jr. |
| 2003/0014759 A1 | 1/2003 | Van Stam | | 2006/0133328 A1 | 6/2006 | Levendel et al. |
| 2003/0018719 A1 | 1/2003 | Ruths et al. | | 2006/0143650 A1 | 6/2006 | Tanikawa et al. |
| 2003/0018797 A1 | 1/2003 | Dunning et al. | | 2006/0146704 A1 | 7/2006 | Ozer et al. |
| 2003/0023910 A1 | 1/2003 | Myler et al. | | 2006/0195748 A1 | 8/2006 | Chen et al. |
| 2003/0032486 A1 | 2/2003 | Elliott | | 2006/0227372 A1 | 10/2006 | Takayanagi |
| 2003/0037033 A1 | 2/2003 | Nyman et al. | | 2006/0247011 A1 | 11/2006 | Gagner |
| 2003/0037150 A1 | 2/2003 | Nakagawa | | 2006/0253595 A1 | 11/2006 | Datta |
| 2003/0055892 A1 | 3/2003 | Huitema et al. | | 2006/0256210 A1 | 11/2006 | Ryall et al. |
| 2003/0073494 A1 | 4/2003 | Kalpakian et al. | | 2006/0259604 A1 | 11/2006 | Kotchavi et al. |
| 2003/0076842 A1 | 4/2003 | Johansson et al. | | 2006/0288103 A1 | 12/2006 | Gobara et al. |
| 2003/0119537 A1 | 6/2003 | Haddad | | 2007/0046669 A1 | 3/2007 | Choi et al. |
| 2003/0135513 A1 | 7/2003 | Quinn et al. | | 2007/0047912 A1 | 3/2007 | Hattori et al. |
| 2003/0152034 A1 | 8/2003 | Zhang et al. | | 2007/0058792 A1 | 3/2007 | Chaudhari et al. |
| 2003/0189587 A1 | 10/2003 | White et al. | | 2007/0061460 A1 | 3/2007 | Khan et al. |
| 2003/0190960 A1 | 10/2003 | Jokipii et al. | | 2007/0076729 A1 | 4/2007 | Takeda |
| 2003/0208621 A1 | 11/2003 | Bowman | | 2007/0078002 A1 | 4/2007 | Evans et al. |
| 2003/0216824 A1 | 11/2003 | Chu et al. | | 2007/0078706 A1 | 4/2007 | Datta et al. |
| 2003/0217135 A1 | 11/2003 | Chatani et al. | | 2007/0082674 A1 | 4/2007 | Pedersen et al. |
| 2003/0217158 A1 | 11/2003 | Datta | | 2007/0086033 A1 | 4/2007 | Tu |
| 2003/0237097 A1 | 12/2003 | Marshall et al. | | 2007/0096283 A1 | 5/2007 | Ljung et al. |
| 2004/0003039 A1 | 1/2004 | Humphrey et al. | | 2007/0097959 A1 | 5/2007 | Taylor |
| 2004/0024879 A1 | 2/2004 | Dingman et al. | | 2007/0101369 A1 | 5/2007 | Dolph |
| 2004/0030787 A1 | 2/2004 | Jandel et al. | | 2007/0118281 A1 | 5/2007 | Adam |
| 2004/0034536 A1 | 2/2004 | Hughes | | 2007/0146347 A1 | 6/2007 | Rosenberg |
| 2004/0034691 A1 | 2/2004 | Tanimoto | | 2007/0165629 A1 | 7/2007 | Chaturvedi et al. |
| 2004/0049086 A1 | 3/2004 | Muragaki et al. | | 2007/0191109 A1 | 8/2007 | Crowder et al. |
| 2004/0053690 A1 | 3/2004 | Fogel et al. | | 2007/0192382 A1 | 8/2007 | Harris |
| 2004/0057348 A1 | 3/2004 | Shteyn et al. | | 2007/0198528 A1 | 8/2007 | Harris |
| 2004/0059711 A1 | 3/2004 | Jandel et al. | | 2007/0208748 A1 | 9/2007 | Li |
| 2004/0063458 A1 | 4/2004 | Hori et al. | | 2007/0217436 A1 | 9/2007 | Markley et al. |
| 2004/0078369 A1 | 4/2004 | Rothstein et al. | | 2007/0259650 A1 | 11/2007 | Felder |
| 2004/0105401 A1 | 6/2004 | Lee | | 2007/0265089 A1 | 11/2007 | Robarts et al. |
| 2004/0111141 A1 | 6/2004 | Brabec et al. | | 2008/0013724 A1 | 1/2008 | Shamoon et al. |
| 2004/0117443 A1 | 6/2004 | Barsness | | 2008/0044162 A1 | 2/2008 | Okada et al. |
| 2004/0123306 A1 | 6/2004 | Gazda et al. | | 2008/0046266 A1 | 2/2008 | Gudipalley et al. |
| 2004/0131255 A1 | 7/2004 | Ben-Yaacov et al. | | 2008/0102947 A1 | 5/2008 | Hays et al. |
| 2004/0133512 A1 | 7/2004 | Woolston | | 2008/0119286 A1 | 5/2008 | Brunstetter et al. |
| 2004/0139228 A1 | 7/2004 | Takeda et al. | | 2008/0152263 A1* | 6/2008 | Harrison ................... 382/313 |
| 2004/0160943 A1 | 8/2004 | Cain | | 2008/0153517 A1 | 6/2008 | Lee |
| 2004/0162059 A1 | 8/2004 | Hiltunen et al. | | 2008/0259042 A1 | 10/2008 | Thorn |
| 2004/0172476 A1 | 9/2004 | Chapweske | | 2008/0280686 A1 | 11/2008 | Dhupelia et al. |
| 2004/0216125 A1 | 10/2004 | Gazda et al. | | 2008/0301318 A1 | 12/2008 | McCue et al. |
| 2004/0233855 A1 | 11/2004 | Gutierrez et al. | | 2008/0307103 A1 | 12/2008 | Marr et al. |
| 2004/0240457 A1 | 12/2004 | Habetha et al. | | 2008/0307412 A1 | 12/2008 | Marr et al. |
| 2004/0266336 A1 | 12/2004 | Patsiokas et al. | | 2009/0011835 A1 | 1/2009 | Hansen et al. |
| 2005/0018312 A1 | 1/2005 | Gruner et al. | | 2009/0075634 A1* | 3/2009 | Sinclair et al. ............ 455/414.1 |
| 2005/0021398 A1 | 1/2005 | McCleskey et al. | | 2009/0077245 A1 | 3/2009 | Smelyansky et al. |
| 2005/0021470 A1 | 1/2005 | Martin et al. | | 2009/0100454 A1 | 4/2009 | Weber |
| 2005/0028197 A1 | 2/2005 | White et al. | | 2009/0138610 A1 | 5/2009 | Gobara et al. |
| 2005/0033655 A1 | 2/2005 | Woolston | | 2009/0150525 A1 | 6/2009 | Edgett et al. |
| 2005/0034162 A1 | 2/2005 | White et al. | | 2009/0240821 A1 | 9/2009 | Juncker et al. |
| 2005/0036616 A1 | 2/2005 | Huang et al. | | 2009/0315766 A1 | 12/2009 | Khosravy |
| 2005/0044568 A1 | 2/2005 | White et al. | | 2010/0083189 A1* | 4/2010 | Arlein et al. .................. 715/863 |
| 2005/0066219 A1 | 3/2005 | Hoffman et al. | | 2010/0113066 A1* | 5/2010 | Dingler et al. ............ 455/456.3 |
| 2005/0066358 A1 | 3/2005 | Anderson et al. | | 2010/0156812 A1 | 6/2010 | Stallings |
| 2005/0071807 A1 | 3/2005 | Yanavi | | 2010/0188353 A1 | 7/2010 | Yoon |
| 2005/0076379 A1 | 4/2005 | White et al. | | 2010/0273452 A1* | 10/2010 | Rajann et al. ................. 455/411 |
| 2005/0086287 A1 | 4/2005 | Datta | | 2011/0010545 A1 | 1/2011 | Kill et al. |
| 2005/0086288 A1 | 4/2005 | Datta et al. | | 2011/0047598 A1 | 2/2011 | Lindley et al. |
| 2005/0086329 A1 | 4/2005 | Datta et al. | | 2011/0161856 A1* | 6/2011 | Nurmi et al. ................. 715/772 |
| 2005/0086350 A1 | 4/2005 | Mai | | | | |
| 2005/0086369 A1 | 4/2005 | Mai et al. | | | | |
| 2005/0093868 A1 | 5/2005 | Hinckley | | EP | 1016960 | 7/2000 |
| 2005/0097386 A1 | 5/2005 | Datta et al. | | EP | 1125617 | 8/2001 |

FOREIGN PATENT DOCUMENTS

| | | |
|---|---|---|
| GB | 2325543 | 11/1998 |
| GB | 2445427 | 7/2008 |
| JP | 63232725 | 9/1988 |
| JP | 8149451 | 6/1996 |
| JP | 9244886 | 9/1997 |
| JP | 9305399 | 11/1997 |
| JP | 9326777 | 12/1997 |
| JP | 10108161 | 4/1998 |
| JP | 10133955 | 5/1998 |
| JP | 10222428 | 8/1998 |
| JP | 10069511 | 3/1999 |
| JP | 11143719 | 5/1999 |
| JP | 11234326 | 8/1999 |
| JP | 2000020795 | 1/2000 |
| JP | 2000124939 | 4/2000 |
| JP | 2000157724 | 6/2000 |
| JP | 2000227919 | 8/2000 |
| JP | 2000298689 | 10/2000 |
| JP | 2001169246 | 6/2001 |
| JP | 2001187273 | 7/2001 |
| JP | 2001314657 | 11/2001 |
| JP | 2002011251 | 1/2002 |
| KR | 1998030143 | 7/1998 |
| KR | 1998033266 | 7/1998 |
| KR | 20000060715 | 10/2000 |
| WO | 9103112 | 3/1991 |
| WO | 9634356 | 10/1996 |
| WO | 9849620 | 5/1998 |
| WO | 9844424 | 10/1998 |
| WO | 0005854 | 2/2000 |
| WO | 0027106 | 5/2000 |
| WO | 0063860 | 10/2000 |
| WO | 0068864 | 11/2000 |
| WO | 0163929 | 8/2001 |
| WO | 0182678 | 11/2001 |
| WO | 0201333 | 1/2002 |
| WO | 0205112 | 1/2002 |
| WO | 0235769 | 5/2002 |
| WO | 03071537 | 8/2003 |
| WO | 2004063843 | 7/2004 |
| WO | 2005088466 | 9/2005 |
| WO | 2007096602 | 8/2007 |

OTHER PUBLICATIONS

"Brief for Appellee", In re Masayuki Chatani et al., U.S. Court of Appeals for the Federal Circuit (2007-1150) (May 21, 2007).
"How Network Load Balancing Technology Works", Microsoft TechNet, Mar. 28, 2003, 2007 Microsoft Corporation, http://technet2.microsoft.com/windowsserver/en/library/1611 cae3-5865-4897-a186-7 . . . .
"Image:TCP State diagram.jpg", Wikipedia, the free encyclopedia, Publication date unknown/ Accessed Jun. 4, 2007, http://en.wikipedia.org/wiki/IMage:TCP_state_diagram.jpg.
"Multicast over TCP/IP HOWTO: Multicast Transport Protocols.", Mar. 20, 1998, http://www.tldp.org/HOWTO/Multicast-HOWTO-9.html.
"Petition for Panel Rehearing," In Re Masayuki Chatani and Glen Van Datta, Appeal From the United States Patent and Trademark Office, Board of Patent Appeals and Interferences, In the United States Court of Appeals for the Federal Circuit, 2007-1150 (U.S. Appl. No. 10/211,128), Jan. 3, 2008.
"Reliable User Datagram Protocol", Wikipedia, the free encyclopedia, Publication date unknown/ Accessed Jun. 4, 2007, http://en.wikipedia.org/wiki/Reliable_User_Datagram_Protocol.
"Reply Brief of Appellants", In re Masayuki Chatani et al., U.S. Court of Appeals for the Federal Circuit (2007-1150) (Jun. 4, 2007).
"Streaming Media", Wikipedia, the free encyclopedia, Publication date unknown/ Accessed Jun. 4, 2007, http://en.wikipedia.org/wiki/Streaming_media#Protocol_issues.
"Transmission Control Protocol", Wikipedia, the free encyclopedia, Publication Date unknown/ Accessed Jun. 4, 2007, http://en.wikipedia.org/wiki/Transmission_Control_Protocol#Ordered_data_transfer.2C_Retransmission_of_lost_packets_.26_Discarding_duplicat.
"User Datagram Protocol", Wikipedia, the free encyclopedia, Publication date unknown/ Accessed Jun. 4, 2007, http://en.wikipedia.org/wiki/User_Datagram_Protocol#Difference_between_TCP_and_UDP.
Adya et al., "A Multi-Radio Unification Protocol for IEEE 802.11 Wireless Networks", Microsoft Technical Report MSR-RT-2003-44, Jul. 2003.
Aronson, "Using Groupings for Networked Gaming", Gamasutra.com, Jun. 21, 2000.
Allen, Arthur D., "Optimal Delivery of Multi-Media Content over Networks", Burst.com Inc., Mar. 15, 2001, San Francisco, CA, USA.
Bahl et al., "SSCH: Slotted Seeded Channel Hopping for Capacity Improvement in IEEE 802.11 Ad-Hoc Wireless Networks", ACM MobiCom, Philadelphia, PA, Sep. 2004.
Boulic et al., "Integration of Motion Control Techniques for Virtual Human and Avatar Real-time Animation", Swiss Federal Institute of Technology, Lausanne, Switzerland, Sep. 1997.
Carter et al., "An Efficient Implementation of Interactive Video-on-Demand," Proc. of the 8th Intl. Symp. on Modeling, Analysis & Simulation etc., IEEE, 2000.
Cavin et al., "On the Accuracy of MANET Simulators", ACM, Toulouse, France, Oct. 2002.
Chin et al., "Implementation Experience with MANET Routing Protocols", ACM SIGCOMM, Nov. 2002.
Chiueh, Tzi-cker, "Distributed Systems Support for Networked Games," Computer Science Department, State University of new york at Stony Brook, Stony Brook, NY, May 1997.
Cisco Systems, Inc., "Network Flow Management: Resource Reservation for Multimedia Flows", Mar. 19, 1999.
Corson, et al., "Internet-Based Mobile Ad Hoc networking", IEEE Internet Computing, 1999.
Diot et al., "Adistributed Architecture for Multiplayer Interactive Applications on the Internet," IEEE vol. 13, Issue 4, Aug. 1999.
Draves et al. "Comparison of Routing Metrics for Static Multi-Hop Wireless Networks", ACM SIGCOMM, Portland, OR, Aug. 2004.
Draves et al., "Routing in Multi-Radio, Multi-Hop Wireless Mesh Networks", ACM MobiCom, Phialdelphia, PA, Sep. 2004.
European Search Report for EP 03 72 1413, Jun. 30, 2005.
F. Audet, NAT Behavioral Requirements for Unicast UDP, Behave Internet-Draft, Jul. 15, 2005.
Festa et al., "Netscape Alumni to Launch P2P Company", Aug. 2, 2001.
Gelman et al., "A Store and Forward Architecture for Video-on-Demand Service," Proc. IEEE ICC, IEEE Press; Piscataway, N.J., 1991, pp. 27.3.1-27.3.5.
Hagsand O: "Interactive Multiuser Ves in the DIVE System", IEEE Multimedia, IEEE Service Center, New York, NY, US vol. 3, No. 1, Mar. 21, 1996, pp. 30-39, XP000582951 ISSN:1070-986X.
Hanada, "The Design of Network Game and DirecPlay", Inside Windows, Softbank K.K., vol. 4, No. 4, pp. 42-57, Apr. 1, 1998.
Holland, et al., "A Rate-Adaptive MAC Protocol for Multi-Hop Wireless Networks", ACM MobiCom 2001, Rome, Italy, Jul. 2001.
Hua et al., "Patching: A Multicast Technique for True Video-on-Demand Services," Proceedings of the ACM Multimedia 98, Sep. 12, 1998, pp. 191-200.
Rosenberg, Interactive Connectivity Establishment (ICE); A Methodology for Network Address Translator (NAT) Traversal for Multimedia Session Establishment Protocols, Mmusic Internet-Draft, Oct. 25, 2004.
Rosenberg, Interactive Connectivity Establishment (ICE); A Methodology for Network Address Translator (NAT) Traversal for Offer/Answer Protocols, Mmusic Internet-Draft, Jan. 16, 2007.
Rosenberg, Interactive Connectivity Establishment (ICE); A Methodology for Network Address Translator (NAT) Traversal for Offer/Answer Protocols, Mmusic Internet-Draft, Jul. 17, 2005.
Rosenberg, Simple Traversal of UDP Through Network Address Translators (NAT), BEHAVE Internet-Draft, Jul. 17, 2005.
Rosenberg, STUN—Simple Traversal of User Datagram Protocols (UDP) Through Network Address Translators (NATs), Network Working Group, Mar. 2003.
Rosenberg, Traversal Using Relay NAT (TURN), MIDCOM Internet-Draft, Oct. 20, 2003.

Rosenberg, Interactive Connectivity Establishment (ICE):A Methodology for Network Address Translator (NAT) Traversal for Multimedia Session Establishment Protocols, Mmusic Internet-Draft, Jul. 19, 2004.

Jain et al., "Impact of Interference on Multi-hop Wireless Network Performance", ACM MobiCom, San Diego, CA, Sep. 2003.

Reimer, J., "Cross-Platform Game Development and the next Generation of Consoles," Nov. 7, 2005, Ars Technica LLC.

Jones, "The Microsoft Interactive TV System: An Experience Report," Technical Report MSR-TR-97-18, Jul. 1997.

Kooser, "The Mesh Pit: Taking Wireless Networks to the Next Level", Entrepreneur Magazine, May 2004.

Kramer et al., "Tutorial: Mobile Software Agents for Bynamic Routing", MIT Lab, Mar. 1999.

Leuf, Bo, "Peer to Peer Collaboration and Sharing Over the Internet", Pearson education, Inc., Boston Massachusetts, pp. 3-73 and 213-288.

Packethop, Inc., "Connectivity that Moves You: PacketHop Mobile Mesh Networking", Belmont, California, Copyright 2003.

Pinho et al.; GloVE: A Distributed Environment for Low Cost Scalable VoD Systems; Oct. 28-30, 2002; IEEE; Proceedings of the 14th Symposium on Computer Architecture and High Performance Computing.

Qiu et al., "Optimizing the Placement of Integration Points in Multi-Hop Wireless Networks", IEEE ICNP 2004.

Office actions mailed Jan. 27, 2005, Jul. 13, 2005, Dec. 29, 2005, May 4, 2006, Jan. 3, 2007 and Jun. 19, 2007 in U.S. Appl. No. 09/765,593, filed Jan. 22, 2001.

Office actions mailed Jun. 22, 2009 and Jun. 22, 2011 in U.S. Appl. No. 12/229,281, filed Aug. 20, 2008.

Office actions mailed Feb. 13, 2008 and Jan. 7, 2009 in U.S. Appl. No. 11/355,327, filed Feb. 15, 2006.

Office actions mailed Feb. 6, 2008 and Jan. 6, 2009 in U.S. Appl. No. 11/367,174, filed Mar. 3, 2006.

Office actions mailed Aug. 8, 2006, Feb. 9, 2007, Aug. 27, 2007, Mar. 31, 2009 and Nov. 27, 2009 in U.S. Appl. No. 10/359,359, filed Feb. 4, 2003.

Office actions mailed Feb. 21, 2008 and Dec. 3, 2008, in U.S. Appl. No. 11/067,100, filed Feb. 25, 2005.

Office actions mailed Oct. 24, 2006, Mar. 2, 2007, Jul. 3, 2007 and Apr. 8, 2008, in U.S. Appl. No. 11/375,526, filed Mar. 13, 2006.

Office actions mailed Jun. 25, 2009, Oct. 24, 2006, Mar. 5, 2007, Jul. 3, 2007, Apr. 9, 2008 and Apr. 1, 2010, in U.S. Appl. No. 11/403,623, filed Apr. 13, 2006.

Office Action mailed Mar. 30, 2009, in U.S. Appl. No. 12/011,903, filed Jan. 29, 2008.

Office Action mailed Jun. 24, 2010, in U.S. Appl. No. 12/049,954, filed Mar. 17, 2008.

Office actions mailed Sep. 24, 2009 and Dec. 1, 2009, in U.S. Appl. No. 12/341,212, filed Dec. 22, 2008.

Office Action mailed Aug. 17, 2011 in U.S. Appl. No. 12/234,671 filed Sep. 21, 2008.

Office actions mailed Mar. 27, 2008, Nov. 12, 2008, May 11, 2009, Nov. 9, 2009, Mar. 8, 2011, and Jul. 13, 2011 in U.S. Appl. No. 10/717,176, filed Nov. 19, 2003.

Office Action mailed Feb. 25, 2009, in U.S. Appl. No. 12/218,591, filed Jul. 15, 2008.

Office Action mailed Sep. 22, 2010, in U.S. Appl. No. 12/218,579, filed Jul. 15, 2008.

Office actions mailed Oct. 2, 2009 and Feb. 1, 2010, in U.S. Appl. No. 12/218,581, filed Jul. 15, 2008.

Office Action mailed Apr. 15, 2010, in U.S. Appl. No. 12/235,438, filed Sep. 22, 2008.

Office actions mailed Sep. 4, 2008, Feb. 20, 2009 and Jul. 12, 2011, in U.S. Appl. No. 11/479,829, filed Jun. 30, 2006.

Office Action mailed Aug. 17, 2011, in U.S. Appl. No. 12/465,280, filed May 13, 2009.

Office Action mailed Jun. 23, 2010, in U.S. Appl. No. 12/534,765, filed Aug. 3, 2009.

Office actions mailed Feb. 9, 2011 and Jul. 20, 2011, in U.S. Appl. No. 12/717,108, filed Mar. 3, 2010.

Office Action mailed Mar. 16, 2011, in U.S. Appl. No. 12/854,046, filed Aug. 10, 2010.

Office actions mailed Nov. 12, 2010 and Jan. 20, 2011, in U.S. Appl. No. 12/839,306, filed Jul. 19, 2010.

Office Action mailed Nov. 12, 2010, in U.S. Appl. No. 12/839,311, filed Jul. 19, 2010.

Office actions mailed Dec. 3, 2010 and May 16, 2011, in U.S. Appl. No. 12/840,977, filed Jul. 21, 2010.

Qiu et al., "Troubleshooting Multihop Wireless Networks", Microsoft Technical Report, Microsoft Research-TR-2004-1, Nov. 2001.

Pike, R. et al., "Plan 9 from Bell Labs", Bell Laboratories, Murray Hill, New Jersey, USA.

Shareaza; May 27, 2003.

Tran et al.; ZIGZAG: An Efficient Peer-to-Peer Scheme for Media Streaming; Mar. 30-Apr. 3, 2003.

University of Rochester, "Computer Networks—Introduction", CSC 257/457 (Fall 2002), Sep. 9, 2002.

Wattenhofer et al., "Distributed Topology Control for Power Efficient Operation in Multihop Wireless Ad Hoc Networks," IEEE INFOCOM 2001.

White et al. "How Computers Work", Oct. 2003, Que, 7th Edition.

Takeda, Y., Symmetric NAT Traversal Using STUN, Internet engineering Task Force, Jun. 2003.

* cited by examiner

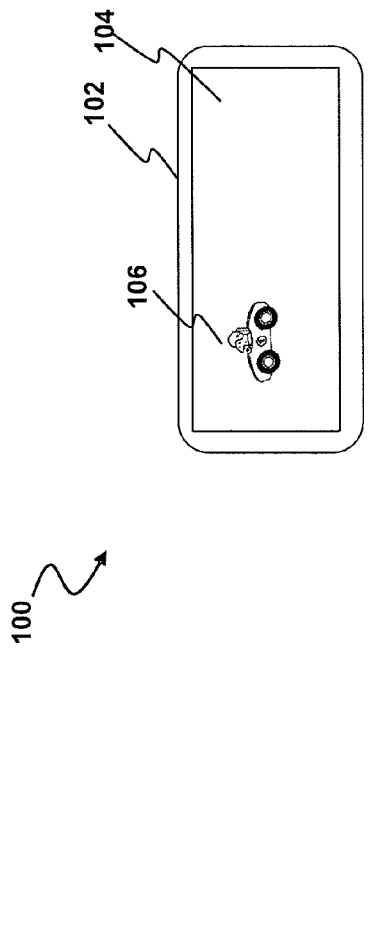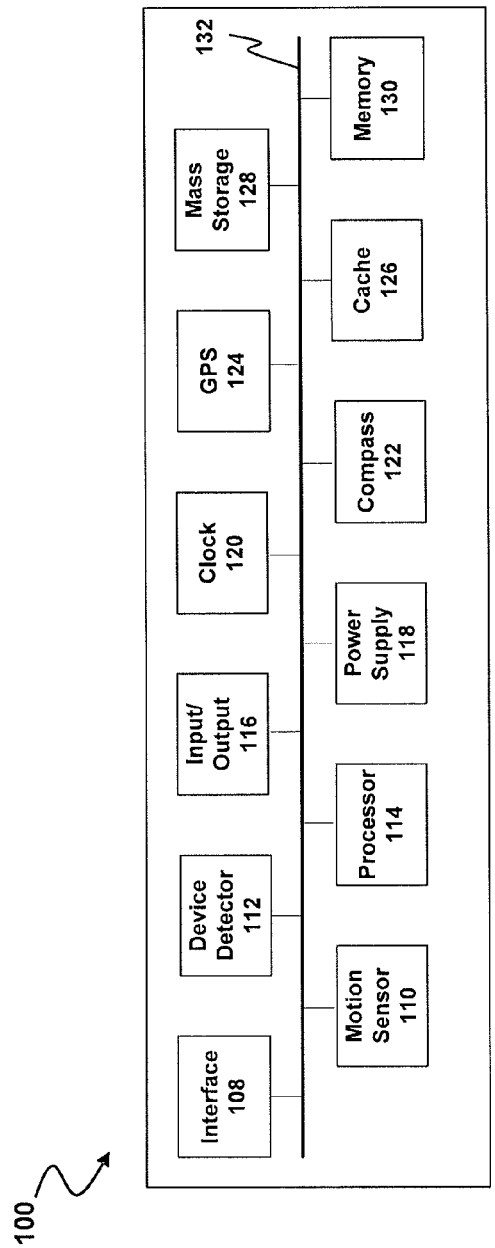

DIRECTION-CONSCIOUS INFORMATION SHARING

CROSS-REFERENCE TO RELATED APPLICATIONS

This application is related to U.S. patent application Ser. No. 12/017,294, filed Jan. 21, 2008 and titled "Data Transfer Using Hand-Held Device," the disclosure of which is incorporated herein by reference.

BACKGROUND OF THE INVENTION

1. Field of the Invention

The present invention generally relates to sharing information. More specifically, the present invention relates to direction-conscious information sharing.

2. Background of the Related Art

Electronic devices capable of communicating through multiple types of connections (e.g., cell, Bluetooth, Internet) are becoming more prevalent. Examples of such devices may include cell phones, smartphones, personal digital assistants (PDAs), portable computing devices, portable email devices, and hand-held game devices. Although connectivity of these devices has increased, the process of transferring files from one device to another device remains fraught with inefficiency and complications.

Presently available methods for sharing digital information using mobile devices include emailing, text messaging, and instant messaging. Such methods generally require entry or reference to an email address, phone number, or other unique identifier. Other methods for sharing information may include use of a physical (e.g., wired), infrared, Bluetooth, or other type of connection. Such connections may require specialized equipment or authentication protocols and may therefore be inconvenient and cumbersome for spontaneous use or use concurrent with other activities.

Another way to share information allows for a user to look up a destination for a file using a browser or menu on a device that has been networked with another device. The file can then be transferred using a "drag-and-drop" operation with a mouse or a series of keyboard commands, commands selected from a menu, touch command, or another type of command. Such file transfers generally require configuring, authenticating, and otherwise provisioning each device for communication with each other.

Another option may be to use "bump" methodologies to exchange contact information between two devices that bump each other. Bumping relies on the ability to detect a bumping movement of two devices in very close proximity to each other, identifying each device, and exchanging information between the devices. Such a solution is limited, however, to devices with accelerometers for detecting movement, users who are in very close proximity to each other so as to be capable of bumping, and situations where no one else in the immediate area is bumping their device. Requiring the physical act of bumping may also be difficult where one or more users are engaged in performance of other tasks demanding much of their attention (e.g., during game play). In addition, bumping may further require that users have previously filled out a contact card with the information to be shared. While pre-filling may be useful for information that changes only rarely (e.g., contact information), it is inconvenient for sending time-sensitive information and for sending information on the fly.

There is therefore a need for improved systems and methods for information sharing.

SUMMARY OF THE CLAIMED INVENTION

Embodiments of the invention provide for direction-conscious information sharing. User input specifying information to be shared and a direction relative to the sender device is received. A recipient device is identified as being located in a target area in the specified direction relative to the sender device. The specified information is sent to the identified recipient device. The recipient device additionally receives a notification indicating a direction of the sender device relative to the recipient device.

Further embodiments of the present invention include methods of direction-conscious information sharing. Such methods may include receiving user input specifying information to be shared and a direction relative to the sender device, identifying a recipient device located in a target area in the specified direction relative to the sender device, and sending the specified information to the identified recipient device. The recipient device may receive a notification indicating a direction of the sender device relative to the recipient device. The direction may be determined based on information provided by a compass and/or a GPS chip.

In some cases, there may be multiple devices that may receive the specified information. As such, identifying the recipient may be based on such factors as alignment, proximity, a common network, a common game session, presence on an inclusion or exclusion list, sender selection, or previous communications.

Various embodiments of the present invention may further include devices for direction-conscious information sharing. Such devices may include a memory for storing information that is shareable with other devices, an interface for receiving user input specifying information to be shared and a direction relative to the device, and a processor for executing instructions stored in memory to identify a recipient computing device in a target area in the specified direction relative to the device. The device may further send the specified information to the identified recipient, which may include a notification indicating a direction of the device relative to the recipient device.

Further embodiments of the present invention, computer-readable storage media is provided. Embodied on such computer-readable storage media may be a program that is executable by a processor to perform a method for direction-conscious information sharing.

BRIEF DESCRIPTION OF THE DRAWINGS

FIG. 1A illustrates an exemplary device for direction-conscious information sharing.

FIG. 1B is a block diagram illustrating components of an exemplary device for direction-conscious information sharing.

DETAILED DESCRIPTION

Figure 2A:
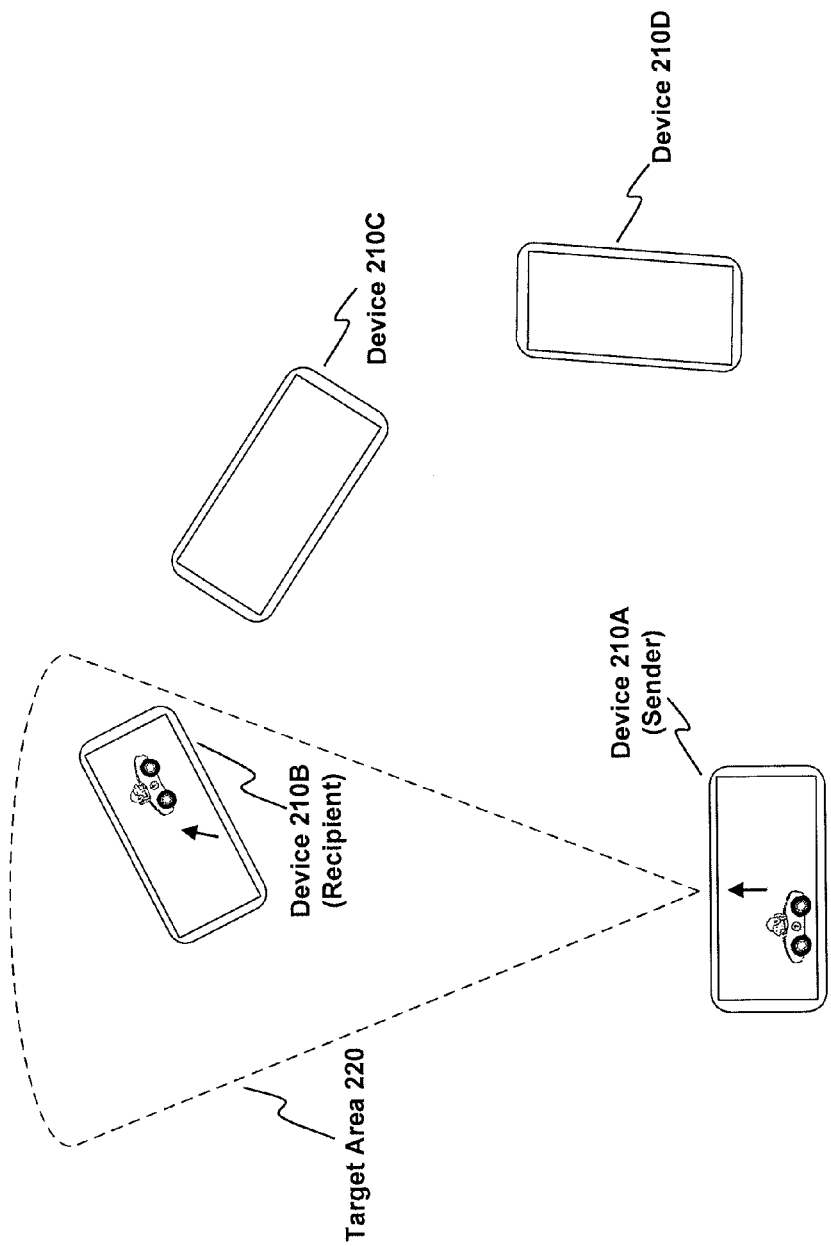
FIG. 2A illustrates an exemplary network environment in which a method for direction-conscious information sharing may be implemented.

Embodiments of the present invention provide for systems and methods of direction-conscious information sharing. User input specifying information to be shared and a direction relative to the sender device is received. A recipient device is identified as being located in a target area in the specified direction relative to the sender device. The specified information is sent to the identified recipient device, including data to allow the receiving device to generate a notification indicating a direction of the sender device relative to the recipient device.

FIG. 1A illustrates an exemplary device 100 for direction-conscious information sharing. Device 100 includes a case 102 and a display 104 upon which may be displayed various types of information. In the illustration of FIG. 1, an icon 106 representing certain information is included in the display 104.

Device 100 may be one of any number of different electronic devices such as cell phones, smartphones, personal digital assistants (PDAs), portable computing devices, portable email devices, and hand-held game devices. Device 100 may be further associated with or accessory to an electronic gaming system, a general-purpose computer, a set-top box, a Blu-Ray® player, or a home entertainment device such as a PlayStation® 3 from Sony Computer Entertainment Inc. as well as any one of a number of portable media devices such as a PlayStation Portable (PSP®), including the PSP® Go system, also from Sony Computer Entertainment Inc.

Device 100 may be configured to manage data from storage media such as memory cards or disk drives as may be appropriate. Device 100 is likewise inclusive of any device capable of receiving data over a network or through some other communications operation such as a synchronization operation with another computing device via an ad hoc communications network, storing that content locally at the device 100 or at a storage device coupled to the device 100, and exchanging data with other devices configured for such exchanges.

Display 104, which is disposed on a side of the case 101 of the device 100, may include one or more screens. Each screen of display 104 may be a flat panel screen (e.g., a liquid crystal display (LCD) array), a touchscreen, or any other type of display screen known in the art. Where display 104 may include a touchscreen, such touchscreen may be based on any suitable touch screen technology, such as resistive, surface-acoustic wave (SAW) capacitive, infrared, strain gauge, optical imaging, dispersive signal technology, acoustic pulse recognition, frustrated total internal reflection or graphics tablet based on magneto-strictive technology to locate the tip of a stylus. A resistive touchscreen panel may include, for example, several layers of thin, metallic, electrically conductive, and resistive material separated by narrow areas of space. When some object contacts the touchscreen, the layers may connect at the point of contact. The display 104 may then electrically act similar to two voltage dividers with connected outputs, thereby registering the contact. Further processing may determine the significance of the registered contact at the particular point of contact.

Icon 106 may include any form of information including text, graphics, photographs, animation, audio, and video. Content represented by icon 106 may include, for example, contact information, documents, music files, video files, and content specifically associated with a type of activity (e.g., game information). Game information may include customized information, information concerning game characters, weapons, accessories, scoring, game records, and code related to a particular game.

FIG. 1B is a block diagram illustrating components of an exemplary device 100 for direction-conscious information sharing. Components of device 100 as illustrated in FIG. 1B include an interface 108, motion sensor 110, device detector 112, processor 114, input/output 116, power supply 118, clock 120, compass 122, GPS chip 124, cache 126, mass storage 128, and memory 130. The components may communicate with each other via system bus 132.

Interface 108 may be configured to facilitate communication between device 100 and other devices. Communication via interface 108 may occur over a wireless connection, which may include a wireless communication network, an optical or infrared link, a radiofrequency link, such as Bluetooth®. A wireless communication network may be a local, proprietary network (e.g., an intranet) and/or may be a part of a larger wide-area network. The wireless communications network may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider.

Motion sensor 110 may detect motion of the device 100 by a user based on any suitable tool for tracking the position and/or orientation of the device 100. Motion sensor 110 may incorporate, for example, inertial sensors (e.g., accelerometers, tilt sensors), acoustic sensors (e.g., sound source and microphone arrays), or optical sensors (e.g., video cameras). Where the motion sensor 110 employs a 6-axis accelerometer, for example, motion of the device 100 may be tracked by obtaining indicators corresponding to translational acceleration along orthogonal x, y and z axes and rotation about each of these axes. Acceleration signals may further be integrated, once to determine change in velocity, and a second time to determine displacement.

Device detector 112 allows for detection of one or more other devices in the vicinity of device 100. Device detection may be based on visual detection where a line of sight between device 100 and another device within reasonably close proximity is unobstructed. Device detection may also be based on a unique identifier associated with the other device and communicated to device 100. Device detector 112 may include a radio-frequency identification (RFID) tag reader for reading a unique RFID tag of another device, a bar code reader for reading a unique bar code of another device, or a video camera enabling visual recognition of another device or a marker of the other device. In some instances, the other device may communicate an identifier via a wireless communication link. The identifier may be specific to a particular application or network (e.g., game or gaming network) and further be associated with an avatar. Such identifiers may be provided by the other devices routinely or in response to a query sent from device 100.

In some instances, information gathered by device detector 112 may be used to generate a map of the other devices proximate to device 100. Such a map may be displayed on the display 104 of device 100. Where the other devices send identifiers including avatar information to device 100, the map may incorporate such avatars to indicate the relative locations of the associated devices.

Some functions of the interface 108, motion sensor 110 and/or device detector 112 may be shared or operated in conjunction. For example, an infrared-based transceiver may be used to sense motion, as well as to provide a communication link. Similarly, a video camera may be used by both motion sensor 110 and device detector 112 to track motion of the case and to identify remote devices.

Device 100 may also include other components that are well-known in the art, such as processor 114, input/output (I/O) elements 116, power supply 118, clock 120, compass (or magnetometer) 122, GPS chip 124, cache 126, mass storage 128, and memory 130. Processor 114 may serve to execute programs, routines, and instructions to perform various functions. In some embodiments, the device 100 may include multiple processors 114 operating in parallel. By way of example, the device 100 may be configured for use as a game device, a phone, a portable media player, an email device, or web browser device.

Depending on the type of device 100, input/output elements 116 may include a keyboard, keypad, touchpad, buttons, mouse, tracking balls, or joystick. Input/output elements 116 may further include gesture recognition tools, which may further operate in conjunction with display 104 (e.g., touchscreen) and/or motion sensor 110. Such gesture recognition tools may be used to recognize, for example, that a flick, swipe, or drag by a user on the display 104 indicates a selection of an icon (e.g., icon 106) and a direction in which the user wishes the icon to move. Gesture recognition may also use sample motion data provided by the user of device 100. Baseline values concerning speed, pressure, and movement area of the motion may be determined from such sample motion data. Variances may be calculated over a predetermined number of samples. Thresholds for recognizing certain gestures may be calculated based on such variances from the baseline values.

FIG. 2A illustrates an exemplary implementation of a method for direction-conscious information sharing. In FIG. 2A, there are four devices 210A-D illustrated. A user of one device (e.g., sender device 210A) who wishes to share information with another device (e.g., recipient device 210B) may select an icon representing such information and perform a directional gesture (e.g., flicking or swiping) in the direction of recipient device 210B. In the illustration of FIG. 2A, an icon is shown in the display of the sender device 210A. An arrow is provided to indicate a direction of the exemplary gesture. A graphical display of the arrow may or may not be generated in the display 104 of sender device 210A upon detection of the directional gesture.

A target area 220 may be defined in the direction of the direction gesture relative to the sender device 210A. The target area 220 may further be defined as being within a certain proximity to the sender device 210A. The proximity may be related to the speed (or other characteristic) of directional gesture, such that a quick gesture may result in a larger target area than a slow gesture. While the target area 220 illustrated in FIG. 2A encompasses only one device (the recipient device 210B), it is possible for the target area 220 to encompass multiple devices.

Where a target area 220 encompasses multiple devices, additional factors may be considered to identify the intended recipient device. Such factors may include alignment with the specified direction, inclusion or exclusion from a list defined by the user of the sender device 210A (e.g., friends lists), selection from a map generated by device detector 112, shared network connection, shared game sessions, previous communications, and confirmation that the device is capable of receiving the specified information. In some instances where the potential recipients cannot be narrowed down to one with any certainty, additional confirmation may be requested from the sender.

In some instances, one of the potential recipient devices may be moving. As such, a device that may be initially in a defined target area 220 when user initiates the directional gesture may move out of the target area 220 when the gesture is completed. Where a possible recipient device is determined to be moving, therefore, the target area 220 may be redefined to encompass the area where the moving device is likely to be located. The new location may be determined based on new location (e.g., GPS) information or estimates (e.g., dead reckoning) based on previous location information.

One consequence of moving is that the line-of-sight between the sender device 210A and the intended recipient device 210B may become blocked or otherwise obstructed. Some forms of communication may become difficult or impossible in such circumstances. As such, a sender may wish to allow for transmission through an intermediary device or peer that can communicate with the intended recipient device 210B.

Once the recipient device 210B is identified, an information packet may be sent to the identified recipient device 210B. The packet may include a notification regarding transmission of the specified information, as well as the specified information itself or a link to the specified information. In addition, the packet may further include the icon 106 representing the specified information, an identifier of the sender device 210A and a direction from which the packet was sent (e.g., the direction of the sender device 210A relative to the recipient device 210B). In the illustration of FIG. 2A, the display of the recipient device 210B includes an icon representing the information packet and an arrow indicating a direction from which the packet came. The display of recipient device 210B may further include an animated representation of the icon flying in from the appropriate direction.

Figure 2B:
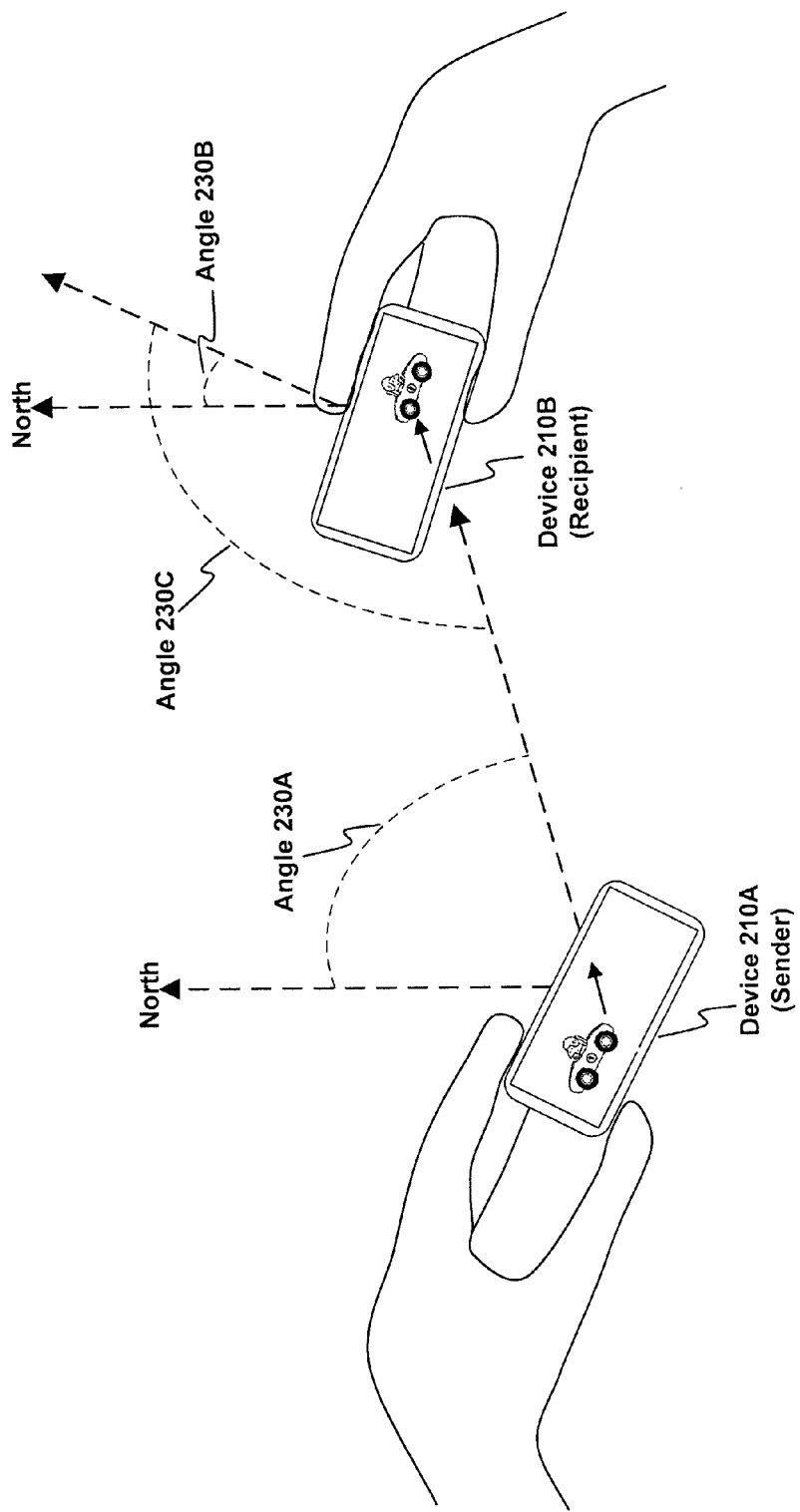
FIG. 2B illustrates an alternative network environment in which a method for direction-conscious information sharing may be implemented.

FIG. 2B illustrates an alternative implementation of a method for direction-conscious information sharing. As mentioned with respect to FIG. 2A, the information packet received by recipient device 210B includes an indication of the direction from which the packet was sent. One way to determine the direction incorporates the use of a compass 122 in each device (e.g., the sender device 210A and the recipient device 210B) to identify which direction is north, thereby enabling determination of the orientation of each device relative to the north. While orientation determinations are described herein as being calculated relative to a vector directed north for the sake of simplicity, orientation may also be determined relative to other directions.

Generally, the relative angle of an incoming packet (angle 230C) may be determined based on the respective orientations of the sender device 210A and the recipient device 210B. While some embodiments may require that the sender device 210A be oriented at or facing the recipient device 210B (or that the recipient device 210B is oriented at or facing the sender device 210A), the direction of the vector between the two devices may generally be specified by the directional gesture performed by the sender. For example, a first angle 230A may be formed by a vector pointing north from the sender device 210A and another vector pointing to the recipient device 210B from the sender device 210A.

In addition, a second angle 230B may be formed by a vector pointing north from the recipient device 210B and another vector from the recipient device 210B that is pointing in the direction in which the recipient device 210B is facing. To determine the direction from which the packet is sent (e.g., angle 230C), the first angle 230A is subtracted from 180°, the difference being added to the second angle 230B. The angle 230C is measured from the vector pointing from the recipient device in the direction in which the recipient device is facing. Information regarding angles 230A and 230B may be exchanged between the sender device 210A and recipient device 210B, so that each may calculate angle 230B, thereby enabling determination of the direction from which the packet was sent. Sender device 210A may therefore send information specifying the direction or simply provide information from which the direction may be determined by recipient device 210B.

Figure 2C:
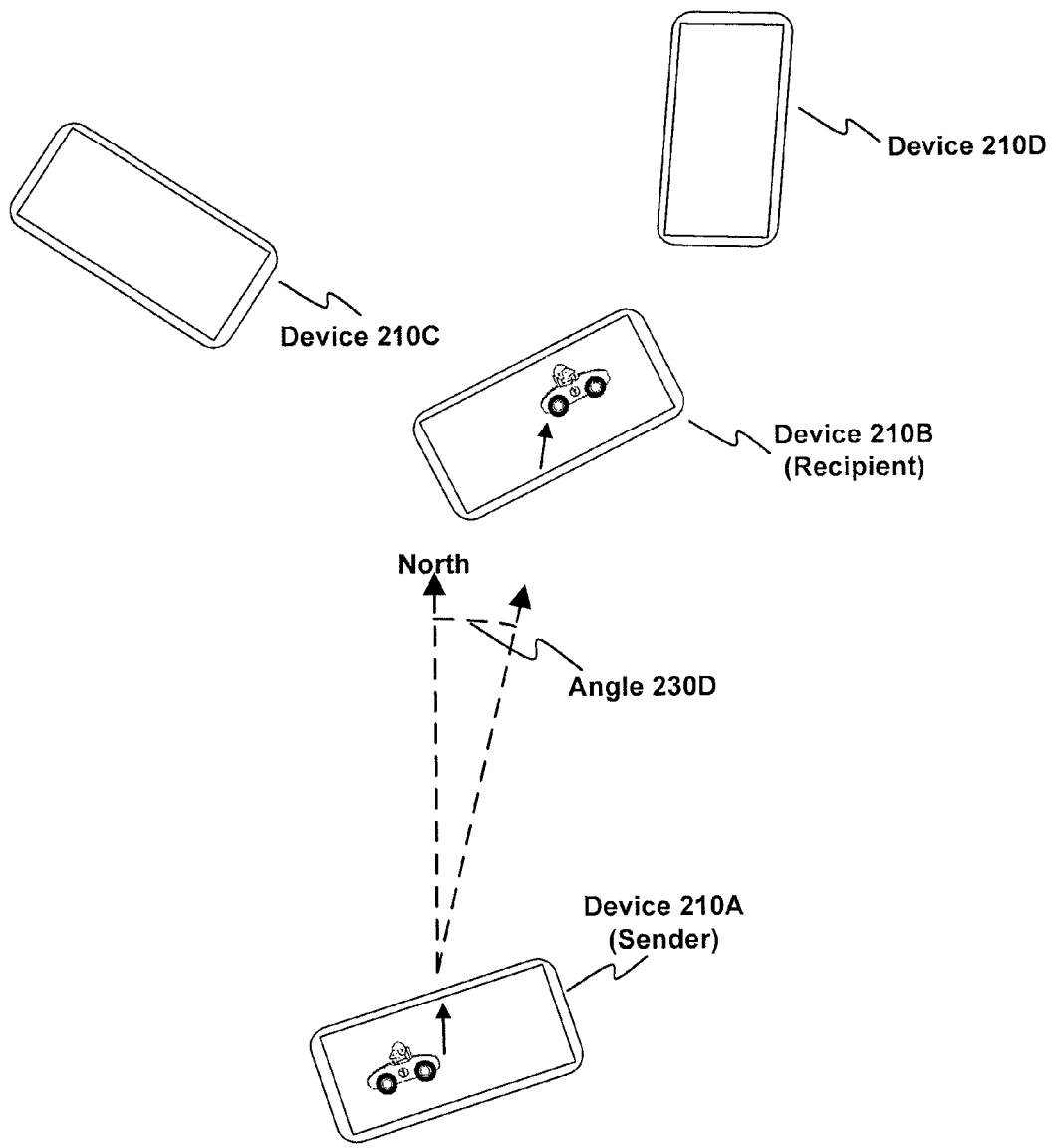
FIG. 2C illustrates another alternative network environment in which a method for direction-conscious information sharing may be implemented

FIG. 2C illustrates another alternative network environment in which a method for direction-conscious information sharing may be implemented. Another way to determine a direction of an incoming packet relies on obtaining location information (e.g., as determined by GPS) for the sender device 210A and the recipient device 210B. For example, a first vector is defined from the location of the sender device to the location of the recipient device. A second vector is defined as pointing north from the location of the sender device. A dot product of the first vector and the second vector is calculated, and the inverse cosine of the dot product is determined. The result of the dot product provides the size of the angle 230D. The angle 230D may be measured from the northward vector to provide the direction of the information packet. Where there are multiple devices that may be included in a target area 220, one way to identify a recipient device is to calculate an angle for each device and select the device with the smallest angle (most aligned with the specified direction).

Figure 3:
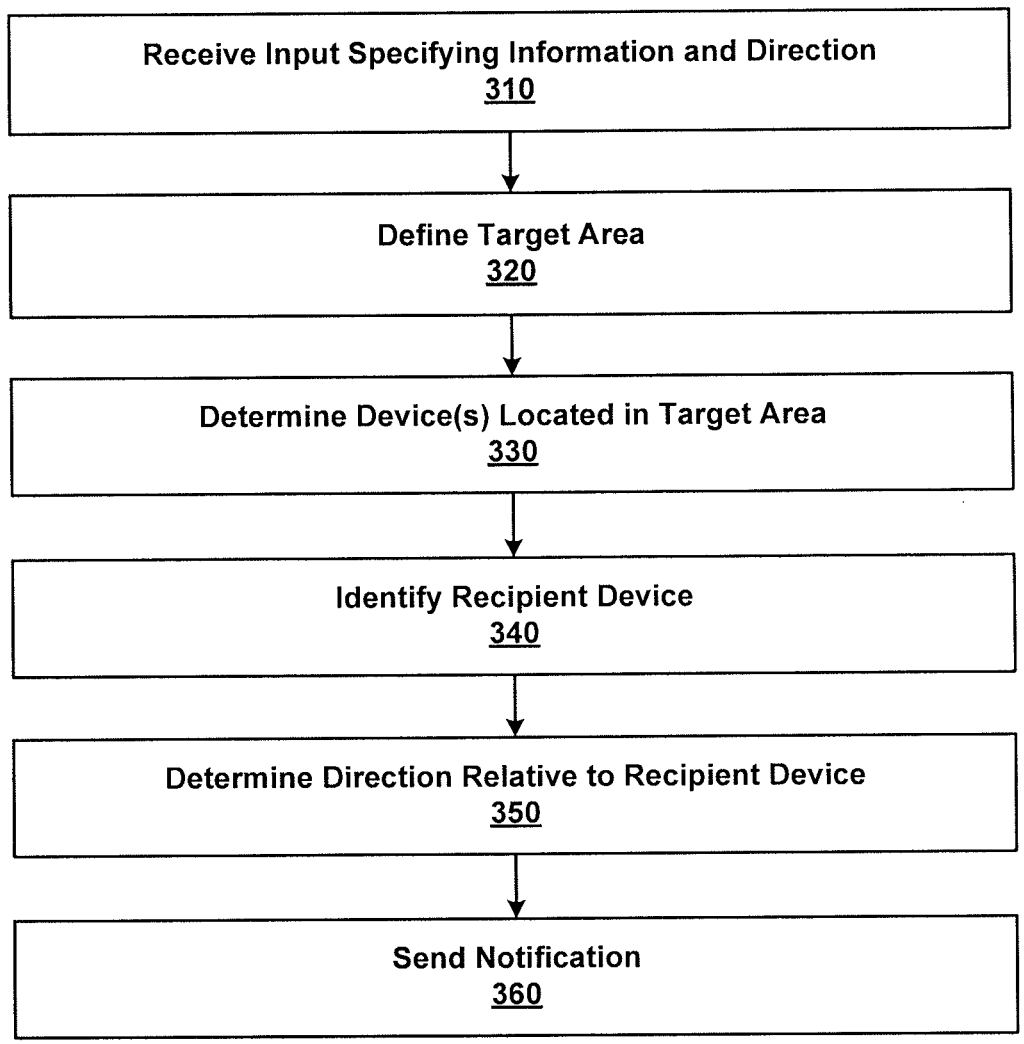
FIG. 3 is a flowchart illustrating an exemplary method for direction-conscious information sharing.

FIG. 3 is a flowchart 300 illustrating an exemplary method for direction-conscious information sharing. In the method, input specifying information and a direction is received by the sender device. A target area is defined in the specified direction. One or more devices are determined to be located in the defined target area. A particular recipient device is identified. The direction of the sender device relative to the recipient device is determined. A notification is sent to the recipient device.

In step 310, input is received specifying information and a direction in which to send the information. To specify information, a user of a sender device 210A may select an icon 106 representing such information from the display 104 of the sender device 210A. To specify direction, the user may swipe, flick, drag, or perform some other directional gesture indicative of a direction in which the user wishes to send the information.

In step 320, a target area 220 is defined in the specified direction. The size of the target area 220, which may be based on distance between the target area 220 and the sender device 210A, may depend on the range of the device detector 112 of the sender device 210A. Alternatively, the distance may be set at a predetermined distance, automatically set based on network considerations, or based on user preference. In some instances, the target area 220 may also be based on a local network (e.g., Wifi network), such that the target area 220 may encompass all devices that are already connected to the local network.

In step 330, one or more devices are determined to be located in the target area 220. Such devices may be detected by device detector 112 of the sender device 210A. Some devices in the target area 220 may be eliminated from consideration as possible recipients based on factors such as inability to receive or process communications, preferences/ conditions for communications, and inclusion or exclusion from certain lists. The sender device 210A may express or have previously expressed a preference that the specified information be sent to one or more devices in the specified direction. For example, the sender playing a multiplayer online game as part of a team may wish to broadcast information to team members in the immediate vicinity. As such, the sender may express a preference for communications to be sent to any devices belonging to team members listed on a roster created or referred to by the sender. Alternatively, the sender may have expressed a preference for communications to go only one recipient.

In step 340, the recipient device 210B is identified. If the target area 220 only includes one device and the sender device 210A did not express any preferences or conditions regarding the identity of the recipient device 210B, it may be easy to identify the recipient device 210B. Where there are multiple devices, however, or where there are conditions, additional factors may be considered, including alignment, proximity, a common network, a common game session, presence on an inclusion or exclusion list, sender selection, or previous communications.

In step 350, a direction indicating the direction of origin of the specified information is determined. The direction may be determined based on the respective orientations of sender device 210A and recipient device 210B (described in detail with respect to FIG. 2B) or based on the respective location information of sender device 210A and recipient device 210B.

In step 360, a notification is sent to the recipient device 210B. The notification may be included in an information packet, which may be accompanied by an indication of the direction of the sender device 210A that is sending the information. Such indication may be an arrow or animation effect in which an icon appears to enter the screen from the direction of the sender device 210A. The notification may additionally include the specified information itself or a link to the information. In some instances, the information may be encrypted or require a password or other type of authentication to access the information.

The present invention may be implemented in an application that may be operable using a variety of end user devices. The present methodologies described herein are fully intended to be operable on a variety of devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) (e.g., processor 114) for execution. Such media can take many forms, including, but not limited to, non-volatile and volatile media such as optical or magnetic disks and dynamic memory, respectively. Common forms of computer-readable storage media include, for example, a floppy disk, a flexible disk, a hard disk, magnetic tape, other magnetic storage media, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method of direction-conscious information sharing, the method comprising:
   receiving user input at a sender device, the user input specifying information to be shared and a direction relative to the sender device;
   executing instructions stored in memory, wherein execution of the instructions by a processor identifies a recipient device located in a target area, the target area being defined based on the specified direction relative to the sender device; and
   sending the specified information to the recipient device, including data to allow the recipient device to generate a notification indicating a direction of the sender device relative to the recipient device, wherein indicating a direction of the sender device relative to the recipient device includes:
      defining a first angle between a vector pointing from the sender device and a vector pointing to the recipient device from the sender device,
      defining a second angle between a vector pointing from the recipient device and a vector pointing in a direction in which the recipient device is oriented,
      determining a third angle by subtracting the first angle from 180° and adding the second angle, and
      determining the direction of the sender device relative to the recipient device based on measuring the third angle from the vector pointing in the direction in which the recipient device is oriented.

2. The method of claim 1, wherein the data also includes information for generating a notification for identifying the sender.

3. The method of claim 1, wherein identifying the recipient device in the target area includes:
   initially determining that the recipient device has recently moved out of the target area in the specified direction relative to the sender device, and
   determining an area where the moving recipient device is likely to be located, wherein the target area is redefined to encompass the area where the recipient device is likely to be located.

4. The method of claim 1, wherein identification of the recipient device is further based on a shared network connection with the sender device.

5. The method of claim 1, wherein identification of the recipient device is further based on a shared session with the sender device.

6. The method of claim 1, wherein identification of the recipient device is further based on previous communication with the sender device.

7. The method of claim 1, wherein identification of the recipient device is further based on GPS information indicating the location of the recipient device in the target area.

8. The method of claim 1, wherein the sender device becomes unable to send the specified information directly to the recipient device and wherein sending the specified information to the identified recipient device includes sending the indicated information to an intermediary device, wherein the intermediary device locates the recipient device and forwards the specified information to the recipient device.

9. The method of claim 1, further comprising determining that a plurality of devices are proximate to the sender device, wherein identification of the recipient device includes selecting the recipient device from the plurality of devices.

10. The method of claim 9, wherein selection of the recipient device is based on a location of the recipient device being aligned with the specified direction relative to the sender device.

11. The method of claim 9, wherein selection of the recipient device is based on inclusion in or exclusion from a list defined by the sender.

12. The method of claim 9, further comprising:
    generating a display comprising avatars representing each of the plurality of devices; and
    receiving a selection from the sender, the selection indicating an avatar associated with the recipient device.

13. The method of claim 9, wherein receiving a selection comprises:
    receiving an indeterminate selection from the sender,
    determining a potential target based on the indeterminate selection,
    modifying the display to indicate the potential target, and
    receiving confirmation from the sender that the potential target is the selected recipient device.

14. A device for direction-conscious information sharing, the device comprising:
    a memory for storing information that is shareable with other devices;
    an interface for receiving user input wherein the user input specifies information to be shared and a direction relative to the device; and
    a processor for executing instructions stored in memory, wherein execution of the instructions by the processor identifies a recipient computing device in a target area, the target area being defined based on the specified direction relative to the device, wherein the specified information is sent to the recipient device, including data to allow the recipient device to generate a notification indicating a direction of the sender device relative to the recipient device, wherein indicating a direction of the sender device relative to the recipient device includes:
       defining a first angle between a vector pointing from the sender device and a vector pointing to the recipient device from the sender device,
       defining a second angle between a vector pointing from the recipient device and a vector pointing in a direction in which the recipient device is oriented,
       determining a third angle by subtracting the first angle from 180° and adding the second angle, and
       determining the direction of the sender device relative to the recipient device based on measuring the third angle from the vector pointing in the direction in which the recipient device is oriented.

15. The device of claim 14, further comprising a magnetometer for determining an orientation of the device.

16. The device of claim 14, further comprising a GPS chip for determining a location of the device.

17. The device of claim 14, wherein the interface receives information from another device and further comprising a display screen for displaying a notification concerning the received information and a direction of the another device relative to the device.

18. The device of claim 14, wherein the user has specified conditions for display of the notification and the conditions include the device having a specified orientation relative to the other device.

19. A computer-readable storage medium, having embodied thereon a program, the program being executable by a processor to perform a method of direction-conscious information sharing, the method comprising:
receiving user input specifying information to be shared and a direction relative to a sender device;
identifying a recipient device located in a target area, the target area being defined based on the specified direction relative to the sender device; and
sending the specified information to the recipient device, including data to allow the recipient device to generate a notification indicating a direction of the sender device relative to the recipient device, wherein indicating a direction of the sender device relative to the recipient device includes:
defining a first angle between a vector pointing from the sender device and a vector pointing to the recipient device from the sender device,
defining a second angle between a vector pointing from the recipient device and a vector pointing in a direction in which the recipient device is oriented,
determining a third angle by subtracting the first angle from 180° and adding the second angle, and
determining the direction of the sender device relative to the recipient device based on measuring the third angle from the vector pointing in the direction in which the recipient device is oriented.

20. A method of direction-conscious information sharing, the method comprising:
receiving user input at a sender device, the user input specifying information to be shared and a direction relative to the sender device;
executing instructions stored in memory, wherein execution of the instructions by a processor identifies a recipient device located in a target area, the target area being defined based on the specified direction relative to the sender device; and
sending the specified information to the recipient device, including data to allow the recipient device to generate a notification indicating a direction of the sender device relative to the recipient device, wherein indicating a direction of the sender device relative to the recipient device includes:
maintaining in memory a location of the sender device and a location of the recipient device,
defining a first vector from the location of the sender device to the location of the recipient device,
defining a second vector as pointing from the location of the sender device,
calculating a dot product of the first vector and the second vector, and
determining the direction of the sender device relative to the recipient device based on taking an inverse cosine of the dot product.

21. The method of claim 20, wherein the data also includes information used to generate a notification that identifies the sender.

22. The method of claim 20, wherein identifying the recipient device in the target area includes:
initially determining that the recipient device has recently moved out of the target area in the specified direction relative to the sender device, and
determining an area where the moving recipient device is likely to be located, wherein the target area is redefined to encompass the area where the recipient device is likely to be located.

23. The method of claim 20, wherein identification of the recipient device is further based on a shared network connection with the sender device.

24. The method of claim 20, wherein identification of the recipient device is further based on a shared session with the sender device.

25. The method of claim 20, wherein identification of the recipient device is further based on previous communication with the sender device.

26. The method of claim 20, wherein identification of the recipient device is further based on GPS information indicating the location of the recipient device in the target area.

27. The method of claim 20, wherein the sender device becomes unable to send the specified information directly to the recipient device and wherein sending the specified information to the identified recipient device includes sending the indicated information to an intermediary device, wherein the intermediary device locates the recipient device and forwards the specified information to the recipient device.

28. The method of claim 20, further comprising determining that a plurality of devices are proximate to the sender device, wherein identification of the recipient device includes selecting the recipient device from the plurality of devices.

29. The method of claim 28, wherein selection of the recipient device is based on a location of the recipient device being aligned with the specified direction relative to the sender device.

30. The method of claim 28, wherein selection of the recipient device is based on inclusion in or exclusion from a list defined by the sender.

31. The method of claim 28, further comprising:
generating a display comprising avatars representing each of the plurality of devices; and
receiving a selection from the sender, the selection indicating an avatar associated with the recipient device.

32. The method of claim 28, wherein receiving a selection comprises:
receiving an indeterminate selection from the sender,
determining a potential target based on the indeterminate selection,
modifying the display to indicate the potential target, and
receiving confirmation from the sender that the potential target is the selected recipient device.

33. A device for direction-conscious information sharing, the device comprising:
a memory for storing information that is shareable with other devices;
an interface for receiving user input wherein the user input specifies information to be shared and a direction relative to the device; and
a processor for executing instructions stored in memory, wherein execution of the instructions by the processor identifies a recipient computing device in a target area, the target area being defined based on the specified direction relative to the device, wherein the specified information is sent to the recipient device, including data to allow the recipient device to generate a notification indicating a direction of the sender device relative to the recipient device, wherein indicating a direction of the sender device relative to the recipient device includes:
maintaining in memory a location of the sender device and a location of the recipient device, defining a first vector from the location of the sender device to the location of the recipient device, defining a second vector as pointing from the location of the sender device, calculating a dot product of the first vector and the second vector, and determining the direction of the sender device relative to the recipient device based on taking an inverse cosine of the dot product.

34. The device of claim 33, further comprising a magnetometer for determining an orientation of the device.

35. The device of claim 33, further comprising a GPS chip for determining a location of the device.

36. The device of claim 33, wherein the interface receives information from another device and further comprising a display screen for displaying a notification concerning the received information and a direction of the another device relative to the device.

37. The device of claim 33, wherein the user has specified conditions for display of the notification and the conditions include the device having a specified orientation relative to the other device.

38. A computer-readable storage medium, having embodied thereon a program, the program being executable by a processor to perform a method of direction-conscious information sharing, the method comprising:

receiving user input specifying information to be shared and a direction relative to a sender device;

identifying a recipient device located in a target area, the target area being defined based on the specified direction relative to the sender device; and sending the specified information to the recipient device, including data to allow the recipient device to generate a notification indicating a direction of the sender device relative to the recipient device, wherein indicating a direction of the sender device relative to the recipient device includes:

maintaining in memory a location of the sender device and a location of the recipient device, defining a first vector from the location of the sender device to the location of the recipient device, defining a second vector as pointing from the location of the sender device, calculating a dot product of the first vector and the second vector, and determining the direction of the sender device relative to the recipient device based on taking an inverse cosine of the dot product.

* * * * *